(No Model.)
F. McLELLAN.
Potato Digger.
No. 237,889. Patented Feb. 15, 1881.
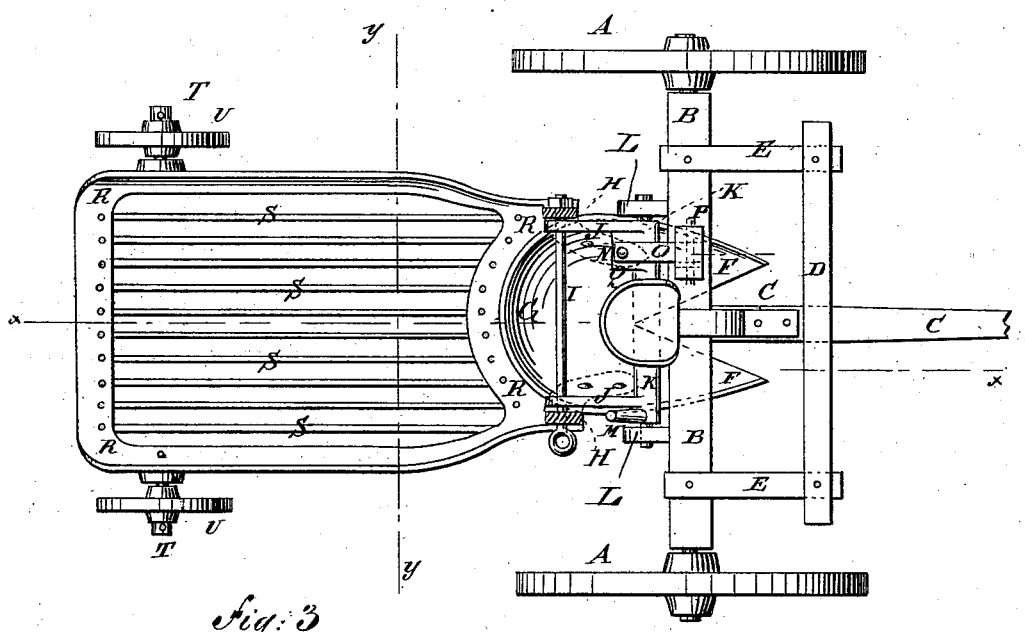
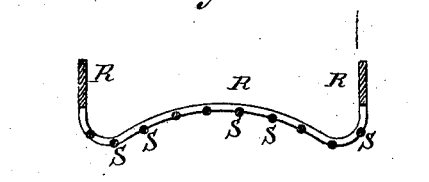
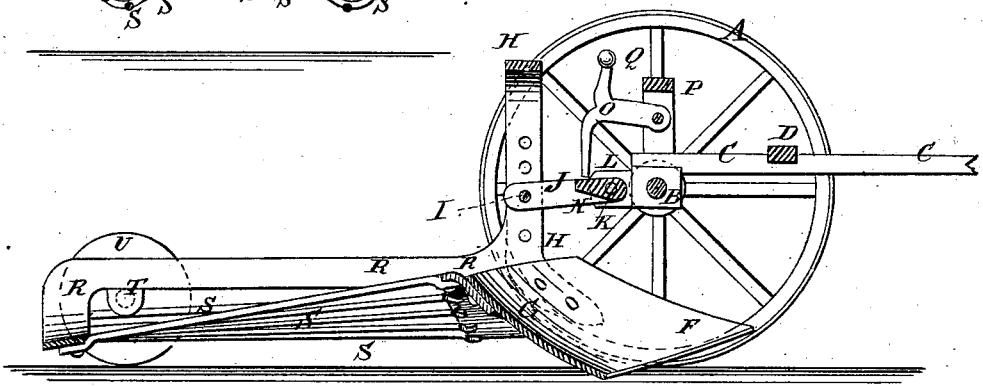
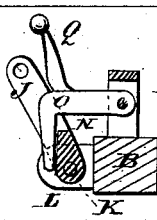
WITNESSES:
Chas. Nida.
C. Sedgwick
INVENTOR:
F. McLellan
BY Munn & Co
ATTORNEYS.

UNITED STATES PATENT OFFICE.

FRANKLIN McLELLAN, OF WHITE RIVER, WASHINGTON TERRITORY.

POTATO-DIGGER.

SPECIFICATION forming part of Letters Patent No. 237,889, dated February 15, 1881.

Application filed October 26, 1880. (No model.)

*To all whom it may concern:*

Be it known that I, FRANKLIN McLELLAN, of White River, in the county of King and Territory of Washington, have invented a new and useful Improvement in Potato-Diggers, of which the following is a specification.

Figure 1 is a plan view of the improvement, the arched standard being shown in section. Fig. 2 is a sectional side elevation taken through the line *x x*, Fig. 1. Fig. 3 is a sectional elevation of the separator, taken through the line *y y*, Fig. 1. Fig. 4 is a sectional elevation, showing the mechanism for holding the plows raised.

Similar letters of reference indicate corresponding parts.

The invention consists in combining a carriage, a forked and concaved plow, an arched standard having holes in its arms, a pin or bolt, a shaft having arms, a lever and catch, a pawl having handle, and a separator having gudgeons and wheels, as hereinafter described.

A represents the wheels, to the center of the axle B of which is attached the tongue C. The connection between the tongue C and axle B is strengthened by the bars D E. The bar D is attached at its center to the tongue C, and at its ends to the forward ends of the bars E, the rear ends of which are attached to the end parts of the axle B.

The plow is forked or is formed of two shears, F, having a V-shaped opening or space between them. The rear parts of the shears F are concaved, and are formed upon or attached to a concave plate, G. The concaved plate G is set in an inclined position, and its rear side parts are attached to the ends of an arched bar, H, which serves as standards to the plow F G.

In the arms of the arched standard or bar H are formed holes to receive a long pin or bolt, I, which pin or bolt I also passes through holes in the rear ends of the arms J. Several holes are formed in the arms of the arched standard H, to receive the pin or bolt I, so that the plow F G can be adjusted to work deeper or shallower in the ground by adjusting the said pin or bolt I. The forward ends of the arms J are formed upon or rigidly attached to the shaft K, the journals of which work in bearings L attached to the rear side of the axle B.

To the upper side of the shaft K, near one end, is rigidly attached, or upon it is formed, an arm, M, to serve as a lever for turning the shaft K to raise and lower the plow F G. Upon the rear side of the shaft K, near its other end, is formed a shoulder or projection, N, to receive and engage with the pawl or dog O, to hold the plow in place when raised from the ground. The pawl O is pivoted to a support, P, attached to the upper side of the axle B. Upon the pawl O is formed, or to it is attached, an arm, Q, to serve as a handle or lever for disengaging the pawl O, to allow the plow F G to drop to the ground.

To the rear part of the inclined concaved plate G, and the lower parts of the arms of the U-standard H, is bolted the front-end bar of a frame, R, to the end bars of which frame are attached, or upon them are formed, the ends of a series of parallel longitudinal bars, S, to form a screen or rack for separating the potatoes from the soil. The upper sides of the bars S are rounded so that they will not cut the potatoes, and so that the potatoes will move along them freely. The middle part and the end parts of the front cross-bar of the frame R are curved upward, forming a projection in the middle and concavities at the sides of the forward part of the separator, which middle projection breaks up the hill as it is received from the plow F G, so that the potatoes and soil will separate easily, the soil falling through the spaces between the bars S, and the potatoes falling to the ground from the rear end of the separator.

Upon the rear parts of the side bars of the frame R are formed, or to them are attached, gudgeons or journals T, to receive the small wheels U, that carry the rear end of the separator R S, and which by passing over the uneven surface of the ground, give sufficient agitation to the separator to separate the potatoes and soil.

With this construction, as the machine is drawn forward the wheels A U run upon the opposite sides of the row to be dug, and the plow F G passes beneath the hills and raises them and the potatoes embedded in them, and delivers the soil and potatoes to the separator which separates the potatoes and soil, the soil falling through the spaces between the bars S, and the potatoes falling from the rear end of the separator upon the top of the soil.

Having thus fully described my invention, I claim as new, and desire to secure by Letters Patent—

1. A potato-digger constructed substantially as herein shown and described, consisting of the carriage A B C D E, the forked and concaved plow F G, the arched standard H, having holes in its arms, the pin or bolt I, the shaft K, having arms J, lever M, and catch N, the pawl O, having handle Q, and the separator R S, having gudgeons T and wheels U, as set forth.

2. The combination, with the arched bar H, supporting the plow F G, of the arms J, secured thereto by bolt I, and rigidly attached to a vibrating shaft, K, as and for the purpose described.

FRANKLIN McLELLAN.

Witnesses:
WM. M. MYERS,
ALFRED WAKEMAN.